T. D. GAIL.
Frying Pan.

No. 111,835.  Patented February 14, 1871.

Witnesses
N. C. Gridley
A. H. Sherburne

Inventor
Titus D. Gail

United States Patent Office.

TITUS D. GAIL, OF WAUKEGAN, ILLINOIS.

Letters Patent No. 111,835, dated February 14, 1871.

IMPROVEMENT IN GRIDDLES.

The Schedule referred to in these Letters Patent and making part of the same.

To all whom it may concern:

Be it known that I, TITUS D. GAIL, of Waukegan, county of Lake, and State of Illinois, have invented a new and improved Griddle; and I do hereby declare the following to be a full, clear, and exact description thereof, which will enable others skilled in the art to which my invention appertains to make and use the same, reference being had to the accompanying drawing forming part of this specification, in which—

Similar letters of reference indicate corresponding parts in the several figures of the drawing.

Figure 1:
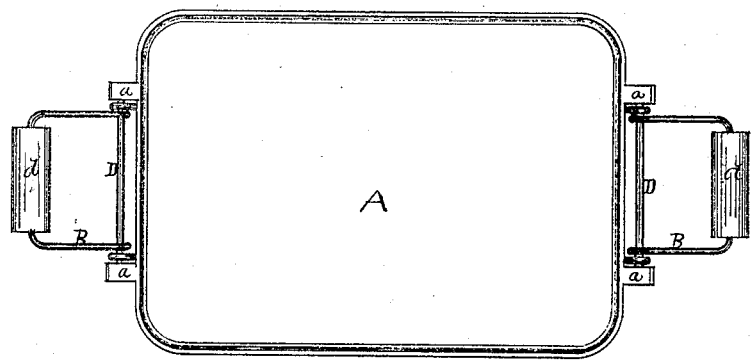
Figure 1 is a top view of my invention.
Figure 2:
Figure 2 is a vertical longitudinal section of the same.

My invention relates to the construction of griddles for culinary uses, by which the same can be raised or lowered so as to regulate the action of the heat thereon; and The improvement consists in attaching to the ends or sides of such griddles metallic handles or their equivalents, the ends of which extend below the bottom surface of the griddle.

In the drawing—

A represents the griddle, made of iron or other suitable material, having flanged sides or edges extending below the bottom surface thereof, and with the handles B attached, and is provided at each end with the projections or lugs *a a*, through and to which are firmly attached the metallic rods D.

To each of said rods is attached a metallic handle, B, with its wooden protector, *d*, each side of which said handles is bent loosely around the rod D, so as to allow of a rocking movement of the same, and the ends thereof continue to and below the bottom surface of the griddle, and bent outwardly therefrom and beyond the lugs *a a*, when the handles proper are in a perpendicular position.

By moving the handles outwardly from the griddle the projecting ends of the handles are brought in a perpendicular position on a line with the ends of the griddle, thereby raising the griddle from the stove or other heating surface upon which it is placed for use, leaving an open space beneath the griddle, through which the air can circulate, thereby cooling the griddle. A reverse motion of the handles restores the griddle to its original position in contact with the stove or other heating surface, by which action of the handle the griddle is raised or lowered, having regard to the heat of the griddle, as may be desired, without removing such griddle from the stove or other heating surface to cool the same.

I do not confine myself to the construction of the griddle with the flanged sides or edges, as the action of the griddle in connection with the handles would be the same without such flanged sides or edges.

Having thus described my invention,

What I claim as new, and desire to secure by Letters Patent, is—

The handles B, or their equivalents, in combination with the griddle A, the whole constructed substantially as and for the purpose described.

The above specification of my invention signed by me this 27th day of December, A. D. 1870.

TITUS D. GAIL.

Witnesses:
 N. C. GRIDLEY,
 N. H. SHERBURNE.